(12) United States Patent
Prabhudesai et al.

(10) Patent No.: US 8,878,963 B2
(45) Date of Patent: Nov. 4, 2014

(54) APPARATUS AND METHOD FOR NOISE REMOVAL IN A DIGITAL PHOTOGRAPH

(75) Inventors: Amit Bhalchandra Prabhudesai, Bangalore (IN); Parijat Prakash Prabhudesai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 11 days.

(21) Appl. No.: 13/350,200

(22) Filed: Jan. 13, 2012

(65) Prior Publication Data

US 2012/0182451 A1 Jul. 19, 2012

(30) Foreign Application Priority Data

Jan. 14, 2011 (IN) .............................. 444/CHE/2011
Dec. 29, 2011 (IN) .............................. 444/CHE/2011
Jan. 11, 2012 (KR) ........................ 10-2012-0003523

(51) Int. Cl.
*H04N 5/217* (2011.01)
*G06K 9/40* (2006.01)
*G06T 5/50* (2006.01)
*G06T 5/00* (2006.01)
*G06T 5/20* (2006.01)
*H04N 5/225* (2006.01)

(52) U.S. Cl.
CPC . *G06T 5/002* (2013.01); *G06T 5/50* (2013.01); *H04N 5/2256* (2013.01); *G06T 2207/20012* (2013.01); *G06T 5/20* (2013.01)
USPC .............................. 348/241; 382/261; 382/265

(58) Field of Classification Search
CPC ... H04N 5/3655; H04N 5/3656; H04N 5/367; H04N 5/2256; G06T 5/001; G06T 5/002; G06T 2207/20012; G06T 5/50; G06T 5/20

USPC .............. 348/241, 260; 396/155; 375/240.12; 382/261, 265
See application file for complete search history.

(56) References Cited

U.S. PATENT DOCUMENTS

| | | | |
|---|---|---|---|
| 5,771,318 A | 6/1998 | Fang et al. | |
| 6,118,547 A * | 9/2000 | Tanioka | 358/1.9 |
| 6,879,732 B1 | 4/2005 | Sokolov | |
| 7,359,576 B1 | 4/2008 | Worthington et al. | |
| 7,457,477 B2 | 11/2008 | Petschnigg et al. | |
| 7,599,569 B2 | 10/2009 | Smirnov et al. | |
| 2004/0008904 A1* | 1/2004 | Lin et al. | 382/275 |
| 2005/0134840 A1* | 6/2005 | Yu | 356/237.2 |
| 2005/0190288 A1 | 9/2005 | Yamada | |
| 2006/0013504 A1* | 1/2006 | Trumer | 382/279 |

(Continued)

OTHER PUBLICATIONS

Digital Photography with Flash and No-Flash Image Pairs; (pp. 9), Petschnigg et al., 2004.

(Continued)

*Primary Examiner* — Sinh Tran
*Assistant Examiner* — Xi Wang
(74) *Attorney, Agent, or Firm* — The Farrell Law Firm, P.C.

(57) ABSTRACT

A method and an apparatus are provided for eliminating noise in a digital image. An ambient image and at least one flash image are captured in succession of a given location. At least one image alignment technique is applied for the ambient image and the at least one flash image. Joint mean shift filtering is applied to the at least one flash image to obtain filter weights. The filter weights are applied to the ambient image to eliminate noise in the ambient image.

20 Claims, 6 Drawing Sheets

(56) References Cited

U.S. PATENT DOCUMENTS

| | | | |
|---|---|---|---|
| 2007/0201853 A1* | 8/2007 | Petschnigg | 396/155 |
| 2007/0280352 A1* | 12/2007 | Mitchell | 375/240.12 |
| 2008/0007797 A1* | 1/2008 | Hayashi et al. | 358/474 |
| 2008/0013784 A1* | 1/2008 | Takeshima et al. | 382/100 |
| 2008/0267494 A1 | 10/2008 | Cohen et al. | |
| 2009/0175609 A1* | 7/2009 | Tan | 396/77 |
| 2010/0142778 A1* | 6/2010 | Zhuo et al. | 382/128 |
| 2010/0253833 A1* | 10/2010 | Deever et al. | 348/362 |
| 2010/0310182 A1* | 12/2010 | Kroepfl et al. | 382/216 |
| 2011/0026815 A1* | 2/2011 | Han | 382/164 |
| 2012/0203371 A1* | 8/2012 | Hsu | 700/138 |
| 2013/0148872 A1* | 6/2013 | Aisaka et al. | 382/128 |

OTHER PUBLICATIONS

Flash Photography Enhancement via Intrinsic Relighting; (pp. 6), Eisemann et al., 2004.

Mean Shift: A Robust Approach Toward Feature Space Analysis; (pp. 17), Comaniciu, 2002.

* cited by examiner

APPARATUS AND METHOD FOR NOISE REMOVAL IN A DIGITAL PHOTOGRAPH

PRIORITY

This application claims priority under 35 U.S.C. §119(a) to an Indian Provisional patent application filed in the Indian Patent Office on Jan. 14, 2011 and assigned Serial No. IN 444/CHE/2011, an Indian Non-Provisional patent application filed in the Indian Patent Office on Dec. 29, 2011 and assigned Serial No. IN 444/CHE/2011, and a Korean Patent Application filed in the Korean Intellectual Property Office on Jan. 11, 2012 and assigned Serial No. 10-2012-0003523, the entire disclosures of which are incorporated herein by reference.

BACKGROUND OF THE INVENTION

1. Field of the Invention

The present invention relates generally to digital photography, and more particularly, to the removal of noise in a digital photograph.

2. Description of the Related Art

Mobile phone cameras have improved greatly in terms of captured image resolution. However, the form of the mobile phone, which enables mobility, places limitations on the optics that can be incorporated into the mobile phone cameras. Also, the Complementary Metal Oxide Semiconductor (CMOS) sensor array density increases with increased resolution, which can lead to increased noise in the image under certain lighting/illumination conditions, such as, for example, in candle-lit environments.

A flash has been utilized to aid in the capture of high-quality photographs in low-light conditions. Recent advancements have enabled a Light Emitting Diode (LED) flash to be incorporated in mobile phone cameras. While the range (i.e., the effective distance) of an LED flash is considerably limited when compared to the conventional flash (i.e., Xenon flash) that is found in digital cameras and camcorders, it is often sufficient for capturing photographs in small gatherings.

However, the presence of a camera flash presents a different problem in digital capture. While the flash enables a high quality photo to be captured, it nullifies the effect of ambience in the captured image. For example, when capturing an image of a restaurant table, with soft, yellow ambient lighting, and a birthday cake with lit candles, the mobile phone camera would typically yield a noisy and/or blurred image. If the photograph is captured with the LED flash, the quality would be higher, but the ambience (i.e., the original lighting of the environment) is destroyed.

A number of image processing solutions have been employed for improving the quality of the images so as to reduce the effects of noise in the image. Some methods employ image data from a single image to estimate filter weights. These weights are applied to filter the image and reduce the noise in the image. However, the estimated filter weights are computed from noisy image data. For low ambient illumination, this estimate can be erroneous, since the image has a low overall contrast. Thus, gradient-based operations will not be very reliable.

Other noise-reduction methods generally make assumptions about the statistical properties of the noise affecting the images. For example, these methods assume correlation between the noise in two images or within parts of the same image. As such, the extent of noise reduction is shown to depend on the correlation of the noise in the two images. When the correlation coefficient is above a certain threshold, the method is fairly effective. However, when the assumptions about the statistical properties do not hold, the method will not be effective.

The noise-reduction methods also employ different filtering techniques to minimize the noise in the image. A bilateral filter is commonly used to reduce the noise in the image. Generally, a single image bilateral filter is employed. The original bilateral filter is used as an edge-preserving smoothing filter and is similar to the simple, single-image mean-shift filter. The difference between the bilateral and mean-shift filters is in the use of local information. Specifically, while bilateral filtering uses a fixed, static window, in mean-shift filtering, information beyond the individual windows is also taken into account. Thus, the mean-shift filter performs better at edge-preserving smoothing as compared to the bilateral filter. The same limitation of static, fixed windows also applies to the Joint or Cross bilateral filter.

SUMMARY OF THE INVENTION

The present invention has been made to address at least the above problems and/or disadvantages and to provide at least the advantages described below. Accordingly, an aspect of the present invention provides a method to remove noise in the ambient image by employing a flash image.

Another aspect of the invention is to use a joint mean-shift filter for noise-reduction and edge-preserving smoothing of the ambient image.

Another aspect of the invention is to provide a method to choose a filter bandwidth parameter so as to obtain effective noise removal.

According to one aspect of the present invention, a method is provided for noise removal in a digital photograph. An ambient image and at least one flash image are captured in succession of a given location. At least one image alignment technique is applied for the ambient image and the at least one flash image. Joint mean shift filtering is applied to the at least one flash image to obtain filter weights. The filter weights are applied to the ambient image to eliminate noise in the ambient image.

According to another aspect of the present invention, an apparatus is provided for noise removal in a digital photograph. The apparatus includes a camera for capturing an ambient image and at least one flash image of a given location in succession. The apparatus also includes a display processor for applying at least one image alignment technique for the ambient image and the at least one flash image, applying joint mean shift filtering to the flash image to obtain filter weights, and applying the filter weights to the ambient image to eliminate noise in the ambient image.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention achieve a method for retaining the original properties of an ambient image while also providing the clarity and high quality obtained by capturing the image with a flash.

Embodiments of the present invention refer to an image captured without a flash as a no flash image or an ambient image.

A method for eliminating noise in a digital image is described herein. The method employs dual image analysis techniques. In the dual image analysis technique, an image that is taken in the natural environment, or ambient image, is used with an image taken with the flash on. These images are taken in succession in the same environment. The method further employs image processing and filtering algorithms. The ambient image is taken as the reference image. Further, the flash image is aligned with respect to the ambient image. Filtering techniques are applied to the flash image by employing a joint mean shift filter. The filter weights are computed for the flash image and various functions required for algorithmic processing are obtained. The computed filter weights are employed on the ambient image so as to obtain a resultant image that has the ambience of the environment in the ambience image and the quality of the flash image.

Figure 1:
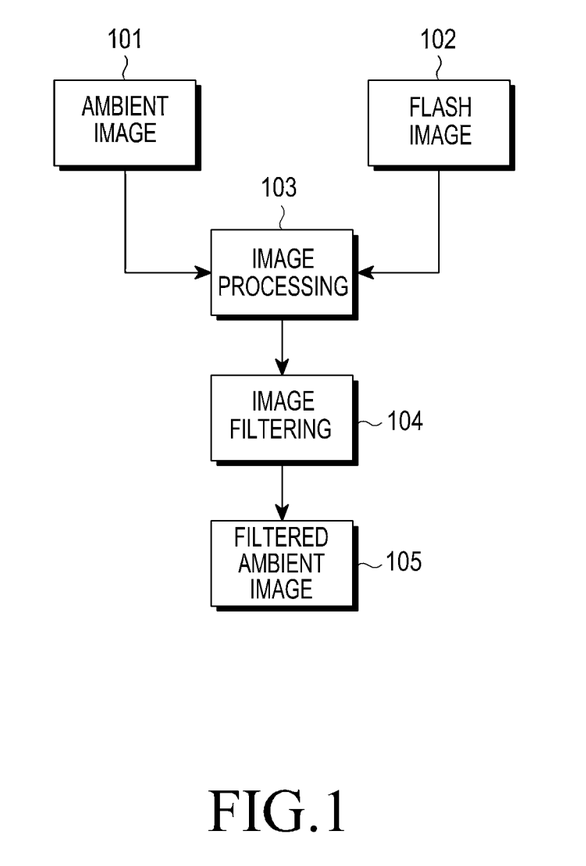
FIG. 1 is a block diagram illustrating a method of noise removal, according to an embodiment of the present invention.

FIG. 1 is a block diagram illustrating method of noise removal, according to an embodiment of the present invention. The method employs a dual image analysis technique for removing noise from images. An ambient image 101 is an image captured without a flash in natural environment conditions. One or more flash images 102 are also captured for the same environment. The flash images 102 are captured in succession with the ambient image 101. The ambient image 101 possesses a lot of noise, which makes the image appear dull and unclear. The flash image 102 is of high quality, but is without the natural ambience of the ambient image 101. Thus, the flash image 102 is employed to obtain filter weights for the ambient image 101, and the noise in the ambient image is removed. The flash image 102 and the ambient images 102 are sent through image processing techniques 103. During image processing 103, the images are aligned. In an embodiment of the present invention, various image alignment techniques may be employed. After the images are aligned, the images are filtered using image filtering techniques 104. In an embodiment of the present invention, algorithms for image filtering 104 are employed that use a joint mean shift filter for filtering the image. Filter weights are computed for flash image 102 and these weights are applied to the ambient image 101 to remove the noise from the ambient image. Accordingly, the methodology eliminates the noise from the ambient image 101 by employing the flash image 102, and a resultant filtered ambient image 105 is obtained.

A camera of a portable terminal captures the ambient image 101 and the flash image 102. An image processor of the portable terminal obtains the filter weights for the ambient image 101 using the flash image 102, and removes the noise in the ambient image 101 using the obtained filter weights.

Figure 2:
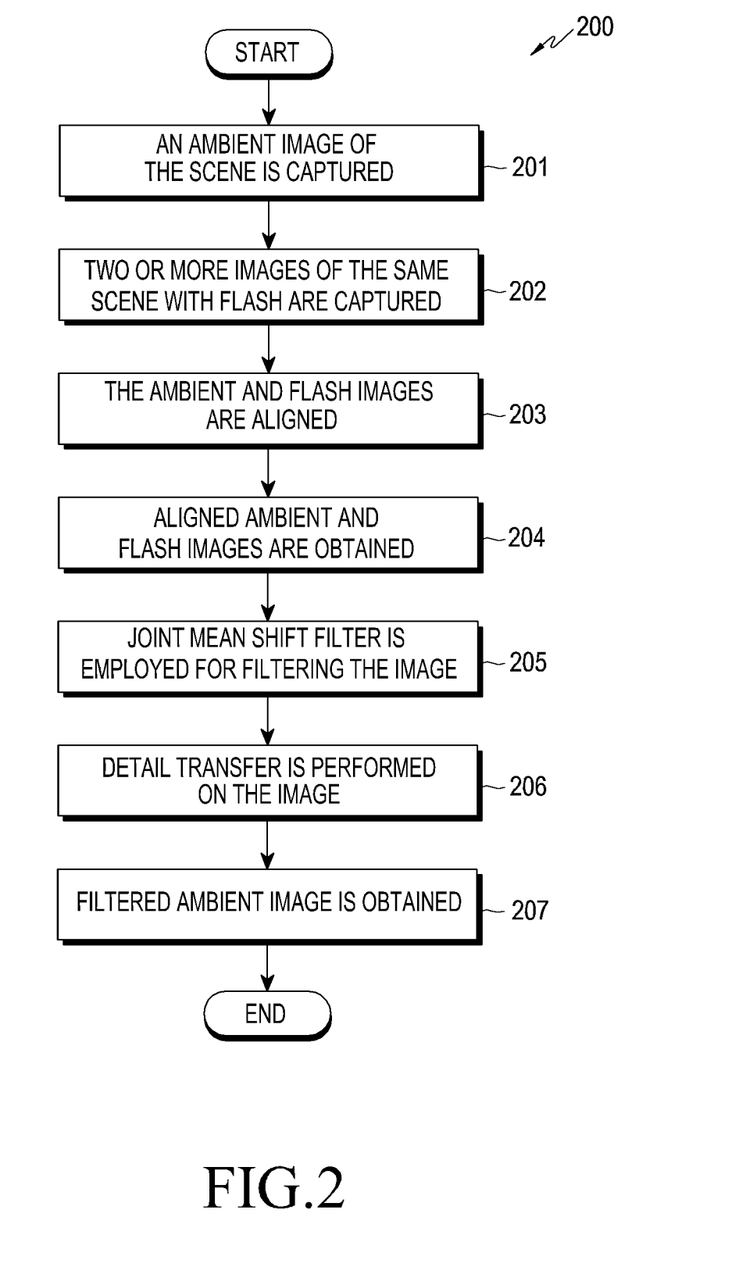
FIG. 2 is a flow diagram illustrating a method of noise removal, according to an embodiment of the present invention.

FIG. 2 is a flow diagram illustrating a method of noise removal, according to an embodiment of the present invention. The method employs dual image analysis by using a flash image and an ambient image. The flash image is employed for obtaining filter parameters. These parameters are applied to the ambient image for noise removal. In an embodiment of the present invention, the flash image is employed for computing filter parameters because the flash image possesses a significantly higher signal-to-noise ratio (SNR) than the ambient image.

An ambient image of the desired scene is captured, in step 201. This image is dull and lacks sharpness due to noise present in the image. However, the ambience of the environment is captured. One or more images of the same scene are captured with the flash on, in step 202. The flash image does not preserve the natural ambience of the environment. Image alignment techniques are employed, and both the flash and the ambient images are aligned, in step 203. In an embodiment of the present invention, the image alignment techniques may include, for example, Scale Invariant Feature Transform (SIFT) and the like. The alignment procedure is performed using a candidate set of points computed by an interest-point detector in the ambient image and one or more flash images. For example, the detector may be embodied as any one of a Harris corner detector, a SIFT detector, etc.

The alignment procedure refines the candidate set generated by using the gradient orientation to eliminate non-matching point pairs. In addition, the alignment procedure uses the refined set of point-pairs to compute a transformation between the ambient image and each of the flash images. The transformation is used to transform each of the flash images to the same co-ordinate system as the ambient image. The resultant aligned images are obtained in step 204. The aligned images (both flash and ambient images) are then sent for filtering. An embodiment of the present invention employs various mean shift filter algorithms. During filtering, the flash image is employed and filter weights and kernel functions required for processing by the mean shift filter are computed, in step 205. The computed filter weights are then applied to the ambient image, and the filter eliminates noise from the ambient image. Further, detail transfer is performed on the resultant image, in step 206. The detail transfer ensures that the details visible in the flash image, which are seen in the flash image, are transferred to the ambient image. The resultant image is then filtered to obtain a noiseless image that preserves the clarity of the flash image and the natural ambience of the ambient image. The steps in 200 may be performed in the order presented, in a different order, or simultaneously. Further, in some embodiments of the present invention, some steps listed in FIG. 2 may be omitted.

The embodiments of the present invention described herein relate to a method for noise reduction in the ambient image using data from the flash image. To achieve this method, a joint mean shift filter is used. The proposed joint mean shift filter builds upon the mean-shift filtering procedure for single images. The joint mean shift filter employs a joint spatial-range domain, where the spatial domain consists of the lattice grid sites, and the range domain consists of the L* component data values.

The procedure for computing the weights employing the mean shift filter is described in greater detail below. The mean shift procedure enables the locating of zeros (of a feature space with underlying density f(x)) without estimating the density. The modes are located among the zeros of the gradient $\nabla f(x)=0$. The density estimator for a given set of data points can be written as set forth in Equation (1) below:

$$\hat{f}_{h,K}(x) = \frac{c_{k,d}}{nh^d} \sum_{i=1}^{n} k\left(\left\|\frac{x-x_i}{h}\right\|^2\right) \qquad (1)$$

In Equation (1), k(.) is the kernel profile and h is the bandwidth parameter. The problem of estimating the modes is translated to the problem of estimating the gradient density. Further, the gradient density takes the form set forth in Equation (2) below:

$$\hat{\nabla} f_{h,K}(x) = \frac{2c_{k,d}}{nh^{d+2}} \left[\sum_{i=1}^{n} g\left(\left\|\frac{x-x_i}{h}\right\|^2\right)\right] \left[\frac{\sum_{i=1}^{n} x_i g\left(\left\|\frac{x-x_i}{h}\right\|^2\right)}{g\left(\left\|\frac{x-x_i}{h}\right\|^2\right)} - x\right] \qquad (2)$$

From Equation (2), the first term is proportional to the density estimate at x, computed with the kernel G, as set forth in Equation (3) below:

$$\hat{f}_{h,G}(x) = \frac{c_{g,d}}{nh^d} \sum_{i=1}^{n} g\left(\left\|\frac{x-x_i}{h}\right\|^2\right) \qquad (3)$$

The second term is the mean shift term, as set forth in Equation (4) below:

$$m_{h,G} = \frac{\sum_{i=1}^{n} x_i g\left(\left\|\frac{x-x_i}{h}\right\|^2\right)}{g\left(\left\|\frac{x-x_i}{h}\right\|^2\right)} - x \qquad (4)$$

The mean shift term is the difference between the weighted mean, using the kernel G for weights, and x, the center of the kernel (window). Using Equations (2) and (3), Equation (2) is set forth as Equations (5) and (6) below:

$$\hat{\nabla} f_{h,K}(x) = \hat{f}_{h,G}(x) \frac{2c_{k,d}}{h^2 c_{g,d}} m_{h,G}(x) \qquad (5)$$

Yielding, $$m_{h,G}(x) = \frac{1}{2} h^2 c \frac{\hat{\nabla} f_{h,K}(x)}{\hat{f}_{h,G}(x)} \qquad (6)$$

Equation (6) shows that, at location x, the mean shift vector computed with kernel G is proportional to the normalized density gradient estimate obtained with kernel K. The normalization is by the density estimate in x computed with the kernel G. The mean shift vector, thus, always points toward the direction of maximum increase in density.

The procedure described above employs a joint mean shift filter and claims all the advantages of the classical mean shift filter procedure over the classical bilateral filter procedure.

In an embodiment of the present invention, the iterative method of the mean shift filter is replaced by a single iteration step to improve computational efficiency of the method.

Since the proposed method uses the flash image data to compute the filter weights, a better noise reduction is provided when compared to using the ambient image alone. This may be explained by the fact that the flash image has a higher signal-to-noise ratio than the ambient image. Computing the kernel g(.) on the flash image yields a more reliable estimate than computing the same kernel on the ambient image.

Further, any suitable kernel that satisfies the conditions for a valid kernel may be used in an embodiment of the present invention. In a specific embodiment of the present invention, the uniform kernel is used and is proven to yield satisfactory results. The uniform kernel is shown to guarantee convergence in a finite number of steps. This is an important point in the realistic practice of the method. It is noted that other kernel profiles may also be used. In another specific embodiment of the present invention, the normal kernel is used in the practice of the invention. However, the convergence rate with a normal profile is slower, though the results are almost always significantly better.

Another important aspect in the practice of embodiments of the present invention is that the extent of filtering (smoothing or noise removal) can be set by modifying/choosing a single parameter h, which is the filter bandwidth parameter. This is a considerable advantage, as it does not require that the user or operator select a large number of complex parameters.

Embodiments of the present invention also propose choosing the bandwidth parameter h in an automated fashion based on an analysis of the ambient image. The method of embodiments of the present invention computes an estimate of the noise in the ambient image to select an appropriate bandwidth parameter, as described in greater detail below.

Figure 3:
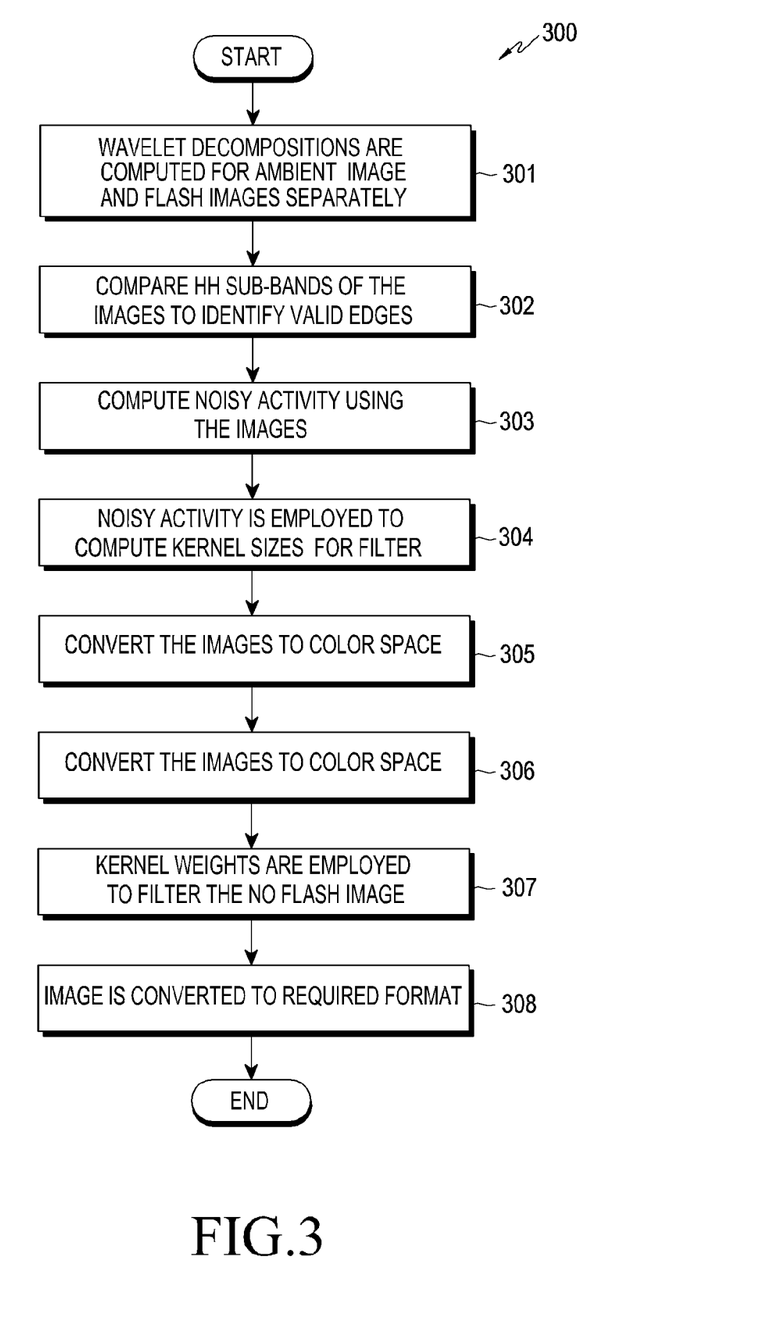
FIG. 3 is a flow diagram illustrating employment of a joint mean shift filter by a filtering mechanism, according to an embodiment of the present invention.

FIG. 3 is a flow diagram illustrating joint mean shift filter employment in a filtering mechanism, according to an embodiment of the present invention. This embodiment of the present invention helps to choose the bandwidth parameter h in an automated fashion, based on an analysis of the ambient image. Further, this embodiment of the present invention computes an estimate of the noise in the ambient image in order to select an appropriate bandwidth parameter.

Referring to FIG. 3, wavelet decompositions are computed for the ambient image and the flash images separately, in step 301. These involve single wavelet decompositions. The HH sub-bands of the flash and the ambient wavelet decompositions are compared to identify valid edges, in step 302. The activity score for the ambient image is computed, in step 303. This activity score is an indication of the noise levels in the ambient image. The computation considers the HH sub-band and the edge information calculated in step 302. The above activity score is computed by comparing the wavelet coefficients to a specified threshold and computing a fraction of the coefficients exceeding the threshold to the total number of wavelet coefficients in a pre-determined area (given window) of the HH sub-band. The threshold value can be set by analyzing the difference between the HH sub-band of the flash and/or ambient image. The activity score computed for a window is computed for non-overlapping windows over the entire image. The activity score for the ambient image is then computed as the average of the activity scores for all windows examined.

The noise activity score is employed to choose amongst the pre-set kernel sizes for a mean shift filter, in step 304. The kernel sizes may be, for example, Low, High and Medium (or weak, average and strong) corresponding to the extent of noise in the original ambient image. The flash and ambient images are converted to the L*a*b* color space, in step 305.

The weights for the given kernel are computed using the flash image, in step 306. The filter weights can be computed using a kernel function, where the arguments to the kernel function are the pixel values of the flash image, in place of the pixel values of the image being filtered. The computed kernel weights are employed to filter the ambient image and remove the noise from the ambient image, in step 307. The kernel function values are computed over a neighborhood (in the joint spatial-range space) of the pixel being filtered or input pixel. Further, the ambient image is converted into the required format, in step 308. The format may be from L*a*b* to RGB and the like. The steps of methodology 300 may be performed in the order presented, in a different order, or simultaneously. Further, in some embodiments of the present invention, some steps listed in FIG. 3 may be omitted.

Figure 4:
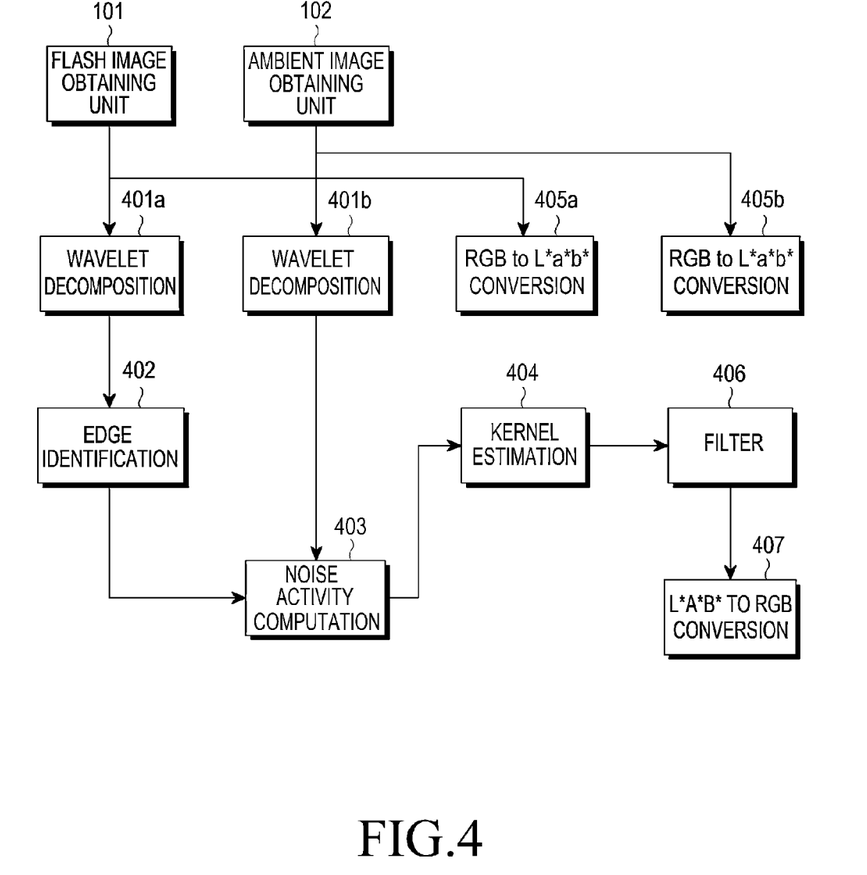
FIG. 4 is a block diagram illustrating a filtering mechanism, according to an embodiment of the present invention.

FIG. 4 is a block diagram illustrating a filtering mechanism, according to an embodiment of the present invention. As depicted in FIG. 4, a flash image obtaining unit 101 takes the flash image, and outputs the flash image to a wavelet decomposition unit 401a and an L*a*b* conversion unit 405a. An ambient image obtaining unit 102 takes the ambient image, and outputs the ambient image to a wavelet decomposition unit 401b and an L*a*b* conversion unit 405b. The wavelet decomposition unit 401a obtains wavelets for the flash image by decomposing the flash image using a predetermined single wavelet decomposition method. The wavelet decomposition unit 401b obtains wavelets for the ambient image by decomposing the ambient image using a predetermined single wavelet decomposition method. Further, an edge identification unit 402 identifies valid edges by comparing the HH sub-bands of both the flash and ambient images. The edges give an indication of the noise levels in the ambient image. A noise activity computation unit 403 computes the noise activity using the HH sub-band of the ambient image and the edge information. The edge information includes information on the valid edges. A kernel estimation unit 404 selects one of the pre-set kernel sizes for the MS filter using the noise activity score (i.e., kernel estimation). The L*a*b* conversion unit 405a converts the flash image into an L*a*b* color space, and the L*a*b* conversion unit 405b converts the ambient image into the L*a*b* color space. For example, if the ambient image and the flash image are in an RGB color space, the L*a*b* conversion units 405a and 405b can convert the ambient image and the flash image into the L*a*b* color space. A filter 406 filters a noise of the ambient image using the weights computed for the given kernel estimate. The filter is embodied as a joint mean shift filter that employs algorithms and equations, as described above, to compute the required weights. The computed kernel weights are used to filter the ambient image, and a resultant ambient image that is free from noise is obtained. An RGB conversion unit 407 converts the resultant ambient image into the RGB color space.

In an embodiment of the present invention, a single-iteration of the mean-shift filter is provided to compute the filtered (noise-reduced) pixel value of the ambient image.

In an embodiment of the present invention, the joint mean shift filter procedure may be performed in place. Specifically, the ambient illumination image pixel data can be replaced by the filtered value without any degradation in the resultant output image.

In an embodiment of the present invention, a computer program may perform the methodologies described above. The computer program may use only integer arithmetic for all operations. Further, the computer program may use an automated method to select the bandwidth parameter vector $h=(h_s,h_r)$ in an adaptive manner based on an analysis of the input image or images.

Figure 5:
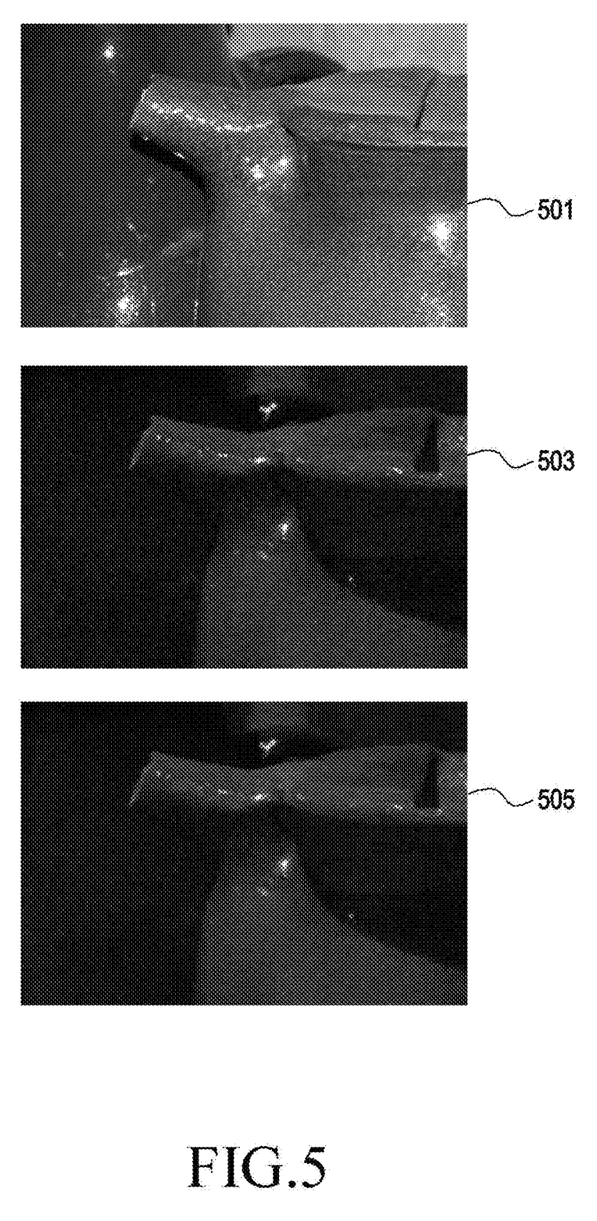
FIG. 5 illustrates snapshots of filtered images, according to an embodiment of the present invention.

FIG. 5 illustrates snapshots of filtered images, according to an embodiment of the present invention. A snapshot 501 is the flash image, which lacks the ambience of the environment. A snapshot 503 shows the ambient image that is taken under low light conditions, and a snapshot 505 is the filtered image. The image is filtered by employing the algorithms described in detail above. The filtered image has less noise and retains the ambience of the original image.

Figure 6:
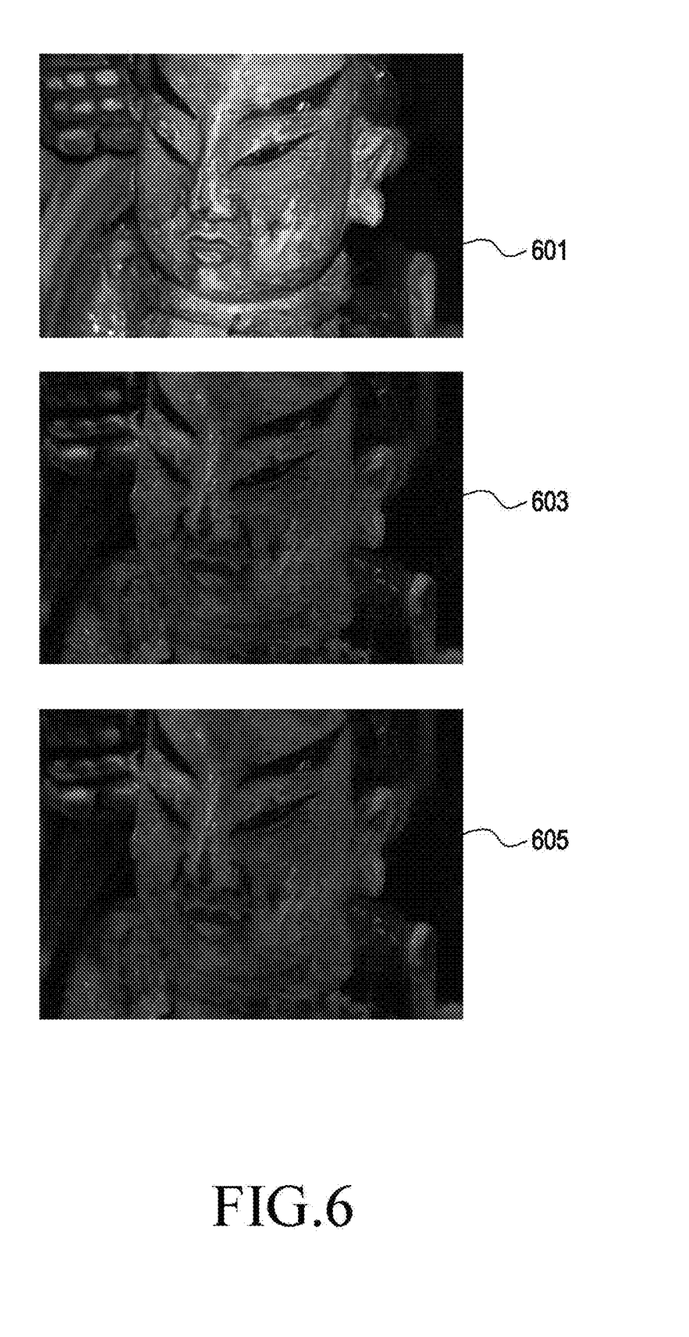
FIG. 6 illustrates snapshots of filtered images, according to an embodiment of the present invention.

FIG. 6 illustrates snapshots of filtered images, according to an embodiment of the present invention. A snapshot 601 is the flash image, which lacks the ambience of the environment. A snapshot 603 shows the ambient image that is taken under low light conditions, and a snapshot 605 is the filtered image. The image is filtered by employing the algorithms described in detail above. The filtered image has less noise and retains the ambience of the original image.

Embodiments of the present invention can be implemented through at least one software program running on at least one hardware device and performing network management functions to control the elements. The elements shown in FIGS. 1 and 4 include blocks, which can be at least one of a hardware device, or a combination of a hardware device and a software module.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for noise removal in a digital photograph, said method comprising:
    capturing an ambient image and at least one flash image of a given location in succession;
    applying at least one image alignment technique to the ambient image and the at least one flash image;
    applying joint mean shift filtering to the at least one flash image to obtain filter weights; and
    applying the filter weights to the ambient image to eliminate noise in the ambient image,
    wherein the image alignment technique computes a transformation between the ambient image and each of the at least one flash image, and transforms each of the at least one flash image to the same coordinate as the ambient image by using the computed transformation.

2. The method as in claim 1, wherein the at least one image alignment technique uses a candidate set of points computed by an interest point detector in the ambient image and the at least one flash image.

3. The method as in claim 2, wherein the interest point detector comprises at least one of a Harris corner detector and a SIFT detector.

4. The method as in claim 2, wherein applying the image alignment technique further comprises refining the candidate set of points generated by using a gradient orientation to eliminate non-matching point pairs.

5. The method as in claim 1, wherein applying joint mean shift filtering comprises converting color image data from the ambient image and the flash image to a uniform color space, wherein the uniform color space comprises at least one of an L*u*v* color space and an L*a*b* color space.

6. The method as in claim 1, wherein the joint mean shift filtering comprises a joint spatial-range domain, wherein a spatial domain comprises lattice grid sites, and a range domain comprises L* component data values.

7. The method as in claim 1, wherein the joint mean shift filtering is performed using a single iterative mean shift filter to filter the ambient image.

8. The method as in claim 1, further comprising selecting an extent of filtering by choosing a bandwidth parameter for a joint mean shift filter.

9. The method as in claim 8, wherein selecting the extent of filtering comprises:
  computing wavelet decompositions for the at least one flash image and the ambient image;
  comparing sub-bands of the wavelet decompositions of the ambient image and the at least one flash image to identify valid edges;
  computing an activity score by using sub-band information and edge information of the ambient image;
  employing the activity score to obtain pre-set kernel sizes for the joint mean shift filter;
  calculating weights for the pre-set kernel sizes using the at least one flash image; and
  filtering the ambient image by employing the calculated weights from the at least one flash image.

10. The method as in claim 9, wherein computing the wavelet decompositions further comprises computing a single wavelet decomposition for each of the ambient image and the at least one flash image.

11. An apparatus for noise removal in a digital photograph, the apparatus comprising:
  a camera configured to capture an ambient image and at least one flash image of a given location in succession; and
  a display processor configured to apply at least one image alignment technique to the ambient image and the at least one flash image, to apply joint mean shift filtering to the at least one flash image to obtain filter weights, and to apply the filter weights to the ambient image to eliminate noise in the ambient image,
  wherein the image alignment technique computes a transformation between the ambient image and each of the at least one flash image, and transforms each of the at least one flash image to the same coordinate as the ambient image by using the computed transformation.

12. The apparatus as in claim 11, wherein the display processor uses a candidate set of points, computed by an interest point detector, in the ambient image and the at least one flash image when the display processor applies the at least one image alignment technique.

13. The apparatus as in claim 12, wherein the interest point detector comprises at least one of a Harris corner detector and a SIFT detector.

14. The apparatus as in claim 12, wherein the image processor refines the candidate set of points generated by using a gradient orientation to eliminate non-matching point pairs.

15. The apparatus as in claim 11, wherein the joint mean shift filtering comprises converting color image data from the ambient image and the flash image to a uniform color space, wherein the uniform color space comprises at least one of a L*u*v* color space and a L*a*b* color space.

16. The apparatus as in claim 11, wherein the joint mean shift filtering comprises a joint spatial-range domain, wherein a spatial domain comprise lattice grid sites, and a range domain comprises L* component data values.

17. The apparatus as in claim 11, wherein the joint mean shift filtering is performed using a single iterative mean shift filter to filter the ambient image.

18. The apparatus as in claim 11, wherein the image processor selects an extent of filtering by choosing a bandwidth parameter for a joint mean shift filter.

19. The apparatus as in claim 18, wherein the image processor comprises:
  a wavelet decomposition unit for computing wavelet decompositions for the at least one flash image and the ambient image;
  a edge identification unit for comparing sub-bands of the wavelet decompositions of the ambient image and the at least one flash image to identify valid edges;
  a noise activity computation unit for computing an activity score by using sub-band information and edge information of the ambient image;
  a kernel estimation unit for employing the activity score to obtain pre-set kernel sizes for the joint mean shift filter; and
  a filter for calculating weights for the pre-set kernel sizes using the at least one flash image, and filtering the ambient image by employing the calculated weights from the at least one flash image.

20. The apparatus as in claim 19, wherein a single wavelet decomposition is computed for each of the ambient image and at least one flash image.

* * * * *